US011242925B2

(12) United States Patent
Di Giovanni et al.

(10) Patent No.: US 11,242,925 B2
(45) Date of Patent: Feb. 8, 2022

(54) RING GEAR FOR AN EPICYCLIC OR PLANETARY REDUCTION GEAR OF A TURBOMACHINE

(71) Applicant: SAFRAN TRANSMISSION SYSTEMS, Colombes (FR)

(72) Inventors: Jean-Charles Michel Pierre Di Giovanni, Moissy-Cramayel (FR); Florian Rappaport, Moissy-Cramayel (FR); Marc Dominique Seyfrid, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/621,400

(22) PCT Filed: Jul. 2, 2018

(86) PCT No.: PCT/EP2018/067844
§ 371 (c)(1),
(2) Date: Dec. 11, 2019

(87) PCT Pub. No.: WO2019/007915
PCT Pub. Date: Jan. 10, 2019

(65) Prior Publication Data
US 2020/0166121 A1    May 28, 2020

(30) Foreign Application Priority Data
Jul. 5, 2017   (FR) ...................... 1756347

(51) Int. Cl.
*F16H 57/08* (2006.01)
*F16H 57/04* (2010.01)
*F16H 55/17* (2006.01)

(52) U.S. Cl.
CPC ......... *F16H 57/08* (2013.01); *F16H 57/0421* (2013.01); *F16H 57/0479* (2013.01);
(Continued)

(58) Field of Classification Search
CPC ... F16H 57/08; F16H 57/0421; F16H 57/0479
See application file for complete search history.

(56) References Cited

U.S. PATENT DOCUMENTS

| 11,022,045 B2 * | 6/2021 | Niepceron | ................ F02C 7/36 |
| 2015/0300197 A1 * | 10/2015 | McCune | .................. F02K 3/06 |
| | | | 415/124.1 |
| 2016/0097330 A1 | 4/2016 | Venter | |

FOREIGN PATENT DOCUMENTS

EP    3109412 A1    12/2016

OTHER PUBLICATIONS

Written Opinion of the International Searching Authority dated Sep. 26, 2018, issued in corresponding International Application No. PCT/EP2018/067844, filed Jul. 2, 2018, 8 pages.
(Continued)

*Primary Examiner* — Derek D Knight
(74) *Attorney, Agent, or Firm* — Christensen O'Connor Johnson Kindness PLLC

(57) ABSTRACT

A ring gear for an epicyclic or planetary reduction gear of a turbomachine, in particular of an aircraft, said ring gear extending about an axis X and comprising first and second coaxial annular elements and comprising, respectively, two inner annular toothing sets of different orientation, each of said toothing sets having a pitch diameter and a median plane substantially perpendicular to said axis and with an intersection point designated Y in an axial cross-section of the ring gear, said first and second annular elements further comprising, respectively, first and second radially outer annular flanges for attaching said first and second elements to each other, wherein each of said first and second flanges
(Continued)

comprises a peripheral portion extending in a plane that is angled with respect to said axis X and that passes substantially through said intersection point Y.

11 Claims, 3 Drawing Sheets

(52) U.S. Cl.
CPC .......... *F16H 55/17* (2013.01); *F16H 57/0486* (2013.01); *F16H 2055/176* (2013.01)

(56) References Cited

OTHER PUBLICATIONS

Preliminary International Report on Patentability dated Jan. 7, 2020, issued in corresponding International Application No. PCT/EP2018/067844, filed Jul. 2, 2018, 1 page.

International Search Report dated Sep. 26, 2018, issued in corresponding International Application No. PCT/EP2018/067844, filed Jul. 2, 2018, 2 pages.

* cited by examiner

RING GEAR FOR AN EPICYCLIC OR PLANETARY REDUCTION GEAR OF A TURBOMACHINE

TECHNICAL FIELD

The field of the present invention is that of turbine engines and more particularly that of differential transmission systems in these turbine engines, in particular planetary or epicyclic reduction gears.

PRIOR ART

The prior art comprises in particular documents WO-A1-2010/092263, FR-A1-2 987 416 and FR-A1-3 041 054.

Current turbine engines, in particular turbine engines that comprise one or more fan propellers for a secondary flow, comprise a transmission system, called a reduction gear, to drive this or these propellers at the correct rotation speed using the power turbine shaft of the primary body of the engine.

The operation of reduction gears, in particular on turbine engines with a fan propeller with a high dilution rate, requires an oil flow rate that is particularly substantial, of about from 6000 to 7000 litres per hour at take-off, in order to ensure the lubrication and the cooling of their pinions and bearings.

Among the reduction gears used, there are planetary and epicyclical (with train) reduction gears which have the advantage of offering substantial reduction rates in the rotation speed in reduced spaces.

Such a reduction gear comprises a sun pinion or central pinion, an external ring gear and planet pinions which are engaged with the sun pinion and with the ring gear, with the support of one of these three components having to be locked with respect to rotation for the operation of the gear train.

When the planet carrier is fixed with respect to rotation, the central pinion and the ring gear are driving and driven, respectively, or vice versa. The reduction gear is then of the "planetary" type, In the opposite case, of an epicyclic reduction gear, the external ring gear is fixed with respect to rotation and the central pinion and the planet carrier are driving and driven.

The main problem with this type of reduction gear is ensuring an optimum meshing of each planet gear on the one hand with the central pinion but also with the ring gear.

The ring gear extends about the axis of the reduction gear and comprises first and second coaxial annular elements and comprising respectively two inner annular teeth sets of different orientations and intended to cooperate with each planet gear. The teeth sets of the ring gear are of the chevron type, with the teeth sets of the elements having helical angles that are substantially opposite.

The annular elements of the ring gear respectively comprise first and second radially outer annular flanges for fastening elements together as well as to an annular ring gear carrier intended to extend around at least one portion of the ring gear.

In current technology, either for an epicyclic or planetary architecture, it is difficult to ensure optimum centering of the elements, as well as of the ring gear carrier. This centering or axial alignment is important in order to minimise any misalignment of the teeth sets of the ring gear elements during operation. The geometry of the aforementioned flanges directly influences misalignment of the teeth sets during operation. The elements tend to come closer or to separate according to the vibration modes and the shapes of the teeth sets, the forces of which are transmitted to the ring gear carrier by the flanges of the ring gear. In addition, a precise angular adjustment is necessary between the two elements in order to angularly locate the teeth sets of the elements.

Centering solutions for a ring gear of this type have already been proposed. However, these solutions are not entirely satisfactory. The solution that consists for example of providing a peripheral rim at the inner periphery of the flange of one of the elements, which is intended to be engaged in an annular recess with a shape complementary to the inner periphery of the flange of the other of the elements, is not satisfactory. This is because the presence of the rim and of the centering recess in the vicinity of the teeth sets of the elements is liable to hinder the transmission of the forces in the elements and cause different mechanical and vibratory behaviours of the elements during operation, and result in misalignments of their teeth sets. Secondly, centering via the inside of the elements prevents the axial position of the webs of these elements from approaching the median plane passing between the teeth sets. Moreover, the oil used for the lubrication of the reduction gear during operation must be able to be discharged and, when radial oil passages are provided through the ring gear, they result in general in radial notches in the the centering rim which are not necessarily regularly distributed about the axis and which may locally increase its flexibility to the detriment of its centering function.

The invention aims to overcome at least some of the problems and disadvantages mentioned hereinabove.

PRESENTATION OF THE INVENTION

The invention relates for this purpose to a ring gear for an epicyclic or planetary reduction gear for a turbine engine, in particular of an aircraft, said ring gear extending around an axis X and comprising first and second coaxial annular elements and comprising respectively two inner annular teeth sets of different orientations, each of said teeth sets having a pitch diameter and a median plane substantially perpendicular to said axis, and the intersection point of which is designated Y in an axial section of the ring gear, said first and second annular elements further comprising respectively first and second radially outer annular flanges for attaching said first and second elements to each other, as well as more preferably to an annular gear ring carrier intended to extend around at least a portion of the ring gear, characterised in that each of said first and second flanges comprises a peripheral portion extending in a plane that is angled with respect to said axis and that passes substantially through said intersection point Y.

In this application, the term "intersection point" means an intersection point between a pitch diameter of a teeth set and a median plane of a teeth set, with this intersection point being located in an axial section of the ring gear.

Moreover, in the present application, the expressions "inner", "outer", "internal", "external", etc., are expressions that refer to an axis of the turbine engine and in particular to the X axis of the ring gear of the reduction gear in the framework of the present invention.

The flanges of the elements are thus conformed to optimise the paths of forces from the teeth sets to the fastening zone of the elements. The angled plane can be appreciated better in two dimensions. In three dimensions, the angled plane is a rather tapered surface wherein the angle of the cone can vary in relation to the X axis. In this case, it can be considered that the peripheral portion extending over a neutral fibre angled with respect to the plane X and passing through the point Y.

The ring gear according to the invention can comprise one or more of the following characteristics, taken separately from one another or in combination with one another:

said peripheral portion is an inner peripheral portion of each of said first and second flanges, said inner peripheral portion connects a substantially radial outer peripheral portion of the corresponding flange, to a longitudinal end of a body of the corresponding element, said body is substantially cylindrical and comprises said teeth set at its inner periphery, said bodies are at an axial distance from one another; this makes it possible to rectify the teeth sets if they are not coincidental, by passing a rectification tool into the inter-body space;

said angled peripheral portions each have an inner peripheral surface that extends radially outwards in the extension of an end radial surface of the corresponding body; the extending to the end radial surface of the body makes it possible to have an assembly that is easier to machine since there are no grooves, and is indirectly more robust, which reduces misalignments;

said angled peripheral portions each form an angle between 0° and 90° in relation to said axis, which allows for a force path that is more direct and better distribution of the stresses;

said angled peripheral portions delimit between them an inter-element annular cavity for the passage of oil; which allows the oil to not stagnate between the angled peripheral portions;

said angled peripheral portions have a substantially constant thickness, which allows for a better distribution of the stresses;

the axial position of the angled peripheral portions in relation to the support plane of the two annular elements is predetermined; it is the position and the angle that make it possible to reduce the misalignment of the teeth sets.

The present invention also relates to an epicyclic or planetary reduction gear for a turbine engine, in particular of an aircraft, characterised in that it comprises a ring gear as described hereinabove.

BRIEF DESCRIPTION OF THE DRAWINGS

The present invention will be better understood, and other details, features and advantages of the present invention will appear more clearly when reading the following description, with reference to the accompanying drawings, in which FIG. 1 schematically shows an axial section of a turbine engine using the invention.

DESCRIPTION OF AN EMBODIMENT OF THE INVENTION

Figure 1:
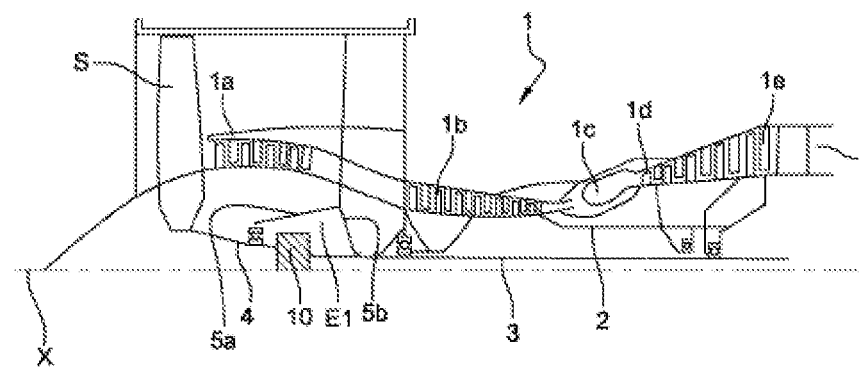

FIG. 1 shows a turbine engine 1 that comprises, conventionally, a fan propeller S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it a high-pressure body (HP). The low-pressure compressor 1a and the low-pressure turbine 1e are connected by a low-pressure shaft 3 and form with it a low-pressure body (LP).

The fan propeller S is driven by a fan shaft 4 which is coupled to the LP shaft 3 by means of an epicyclic reduction gear 10 shown here schematically.

The reduction gear 10 is positioned in the front portion of the turbine engine. A fixed structure schematically comprising, here, an upstream portion 5a and a downstream portion 5b is arranged in such a way as to form an enclosure µl that surrounds the reduction gear 10. This enclosure µl is here closed upstream by seals on a bearing allowing the fan shaft 4 to pass through, and downstream by seals at the bushing of the LP shaft 3.

Figure 2:
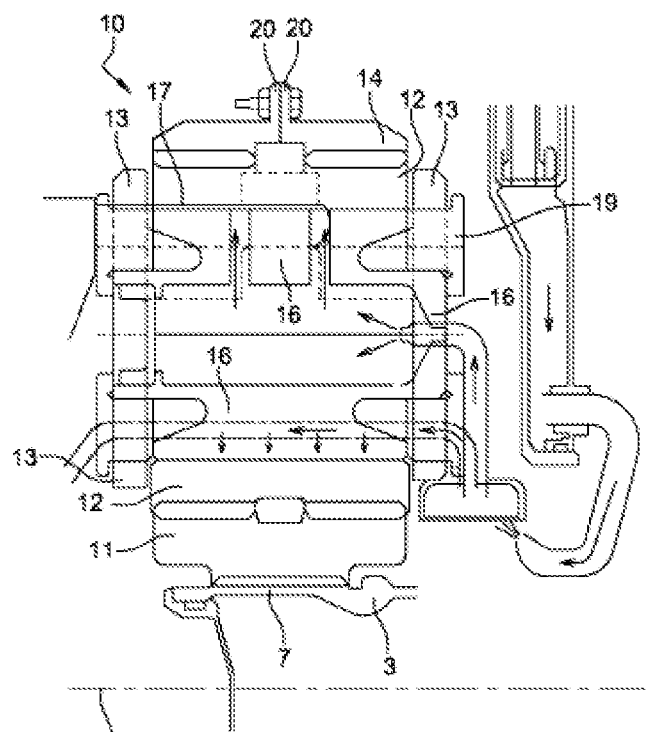
FIG. 2 shows a detailed cross-section view of an epicyclic reduction gear.
Figure 3:
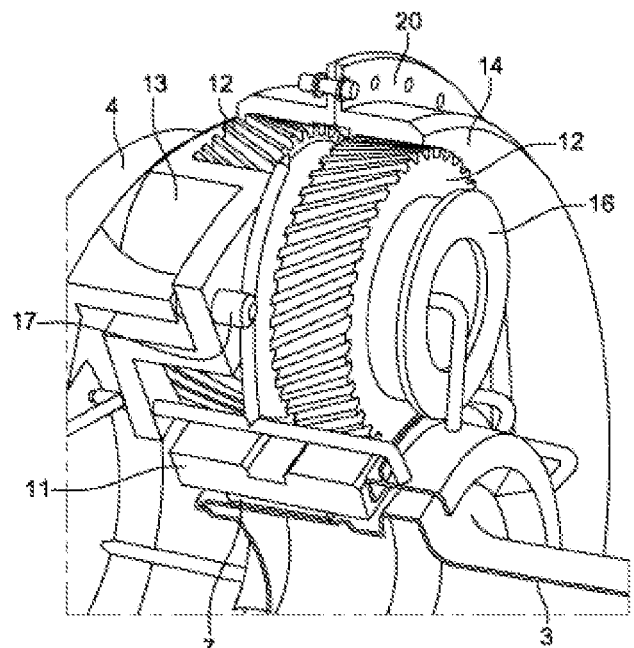
FIG. 3 is a cutaway view and in perspective of the reduction gear of FIG. 2.

In reference to FIGS. 2 and 3, the reduction gear 10 comprises a ring gear 14 that is fixed by means of a support 20 to the fixed structure 5a, 5b with flexible means arranged so as to allow it to follow any movements of the fan shaft 4, in certain cases with degraded operation for example. In a planetary architecture, the support is composed of a more or less flexible portion that drives the ring gear and a shafted portion held by roller bearings or bearings and on which the fan is mounted. These means of fastening are known to those skilled in the art and are not discussed in detail here. A brief description can be found for example in FR-A1-2987416.

The reduction gear 10 meshes on the one hand on the LP shaft 3 by means of splines 7 which drive a planetary gear pinion 11, and on the other hand on the fan shaft 4 which is attached to a planet carrier 13. Conventionally, the planetary pinion 11, the axis of rotation X of which coincides with that of the turbine engine, drives a series of planetary pinions or planetary gears 12, which are regularly distributed over the circumference of the reduction gear 10. The number of planetary gears 12 is generally defined between three and six. The planetary gears 12 also rotate about the axis X of the turbine engine except in the case of a sun gear where they rotate solely about their axes of revolution, by meshing on inner teeth sets of the ring gear 14, which is fixed to a stator of the turbine engine by means of flanges 20 in the case of an epicyclic gear or fixed to a rotor of the turbine engine in the case of a sun gear. Each of the planetary gears 12 freely rotates about a planetary axis 16 connected to the planet carrier 13, using a bearing that can be smooth, as shown in FIG. 2, or a bearing with rolling elements (ball or roller bearings).

The rotation of the planet gears 12 about their planetary axis 16, due to the cooperation of their pinions with the teeth sets of the ring gear 14, drives the rotation of the planet carrier 13 about the axis X, and consequently that of the fan shaft 4 that is linked to it, at a rotation speed that is less than that of the LP shaft 3.

FIG. 2 shows, with FIG. 3, the movement of the oil to the reduction gear 10 and its movement inside the latter. Arrows show in FIG. 2 the path followed by the oil from, in this example, a buffer tank connected to the fixed structure of the turbine engine, to the pinions and to the bearings to be lubricated. The lubrication device conventionally comprises three portions: a first portion connected to the fixed structure and delivering the oil to the rotating portions of the reduction gear 10, a wheel rotating with the planet carrier 13 that receives this oil in the case of an epicyclic gear and a distributor mounted on the planet carrier, which are fixed on a planetary architecture, and oil distribution circuits supplied with oil by the impeller in order to convey it to the locations to be lubricated.

Figure 4:
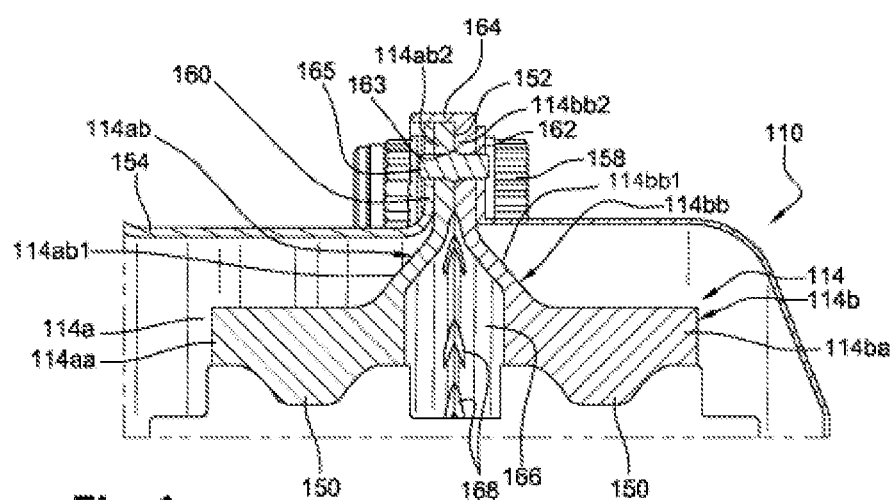
FIG. 4 is a partial axial section view of a reduction gear provided with a ring gear according to the invention.
Figure 5:
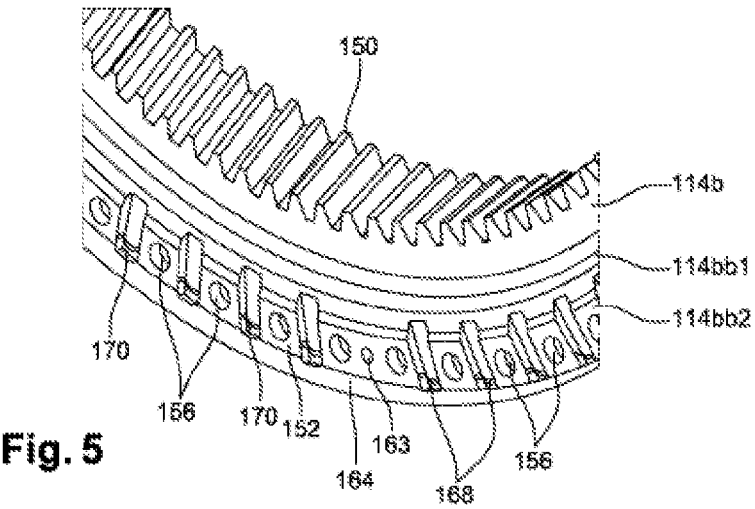
FIG. 5 is a partial perspective view of the ring gear of FIG. 4.
Figure 6:
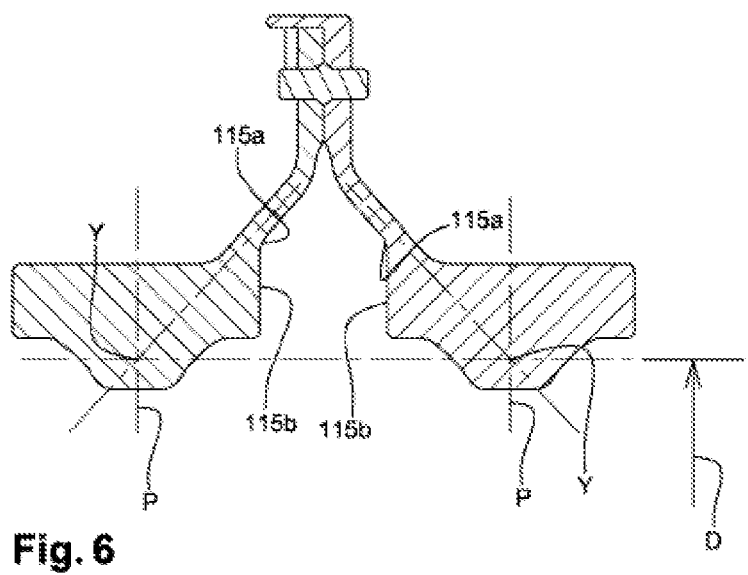
FIG. 6 is a partial axial cross-section of the ring gear of FIG. 4.

FIGS. 4 to 6 show an embodiment of a ring gear 114 according to the invention.

The ring gear 114 extends around an axis that is the axis X of the reduction gear 110 and of the turbine engine, and comprises two coaxial annular elements, termed first annular element 114*a* or upstream element and second annular element 114*b* or downstream element.

Each element 114*a*, 114*b* comprises an annular body 114*aa*, 114*ba* of generally cylindrical shape and connected to an annular flange 114*ab*, 114*bb* extending radially outwards.

Each body 114*aa*, 114*ba* comprises an inner annular teeth set 150 at its inner periphery. Although not visible in the drawings, the teeth sets 150 of the two bodies or elements are complementary to teeth sets of the planetary gears, which are of the type shown in FIG. 3. The teeth sets 150 of the elements 114*a*, 114*b* are in a chevron.

Each teeth set 150 comprises an outside diameter that passes through its outer periphery, an inside diameter that passes through its inner periphery, and a pitch diameter D that is measured substantially at mid-height or radial mid-dimension of the teeth set. Moreover, P denotes a median plane of each teeth set, with this plane being substantially perpendicular to the aforementioned axis and passing substantially in the middle of the teeth set in the axial direction.

The body 114*aa*, 114*ba* of each element is connected by a longitudinal end to the corresponding flange 114*ab*, 114*bb*. The body 114*aa* is connected at its downstream end, located on the side of the other body 114*ba*, to the flange 114*ab*, and the body 114*ba* is connected at its upstream end, located on the side of the other body 114*aa*, to the flange 114*bb*. Each flange 114*ab*, 114*bb* has the general shape of a dihedron and comprises two peripheral portions, respectively inner 114*ab*1, 114*bb*1 and outer 114*ab*2, 114*bb*2.

The outer peripheral portions 114*ab*2, 114*bb*2 extend substantially perpendicularly to the axis and therefore have an orientation that is substantially radial. They are intended to be axially pressing against one another and thus each include an annular radial support surface 152.

The portions 114*ab*2, 114*bb*2 are used to fasten the elements 114*a*, 114*b* together, as well as to a ring gear carrier 154 in the example shown.

For this, the portions 114*ab*2, 114*bb*2 each comprise an annular row of axial through-orifices 156 for the passage of the fastening means 158 of the screw-nut or similar type. The orifices 156 of the portions 114*ab*2, 114*bb*2 are aligned and receive the fastening means 158.

The ring gear carrier 154 also comprises an annular flange 160 for fastening to the flanges 114*ab*, 114*bb* and in particular to the portions 114*ab*2, 114*bb*2. The flange 160 is applied axially on one of the portions 114*ab*2, 114*bb*2, namely here the portion 114*ab*2 of the upstream element 114*a*. The portion 114*ab*2 is thus inserted axially between the flange 160 and the portion 114*bb*2. The converse is also possible. By converse, this means that the ring gear carrier is on the right side of the ring gear, which represents the rear of the engine.

The flange 160 comprises orifices aligned with the orifices 156 and which also receive the fastening means 158, heads of which can be axially applied on the downstream face of the portion 114*bb*2 and nuts of which can be axially applied on the upstream face of the flange 160 or vice versa. In the example shown, a flange 162 of an annular oil collector is bearing axially on the portion 114*bb*2 and receives on its downstream face the heads of the nuts.

The portions 114*ab*2, 114*bb*2 further include a first set of axial tapped through-holes 163 that allow for dismantling the ring gear carrier 154 with the ring gear 114. A second set of axial tapped through-holes 163 makes it possible to dismantle the element 114*a* from the element 114*b*. The portions 114*ab*2, 114*bb*2 include also at least one pin 165 for the angular fixing of the elements 114*a*, 114*b*. Each portion 114*ab*2, 114*bb*2 can include one or more of these holes 163, intended to be aligned with one or more similar holes 163 of the other portion, and to receive a fixing pin 165. The pin 165 here has a general cylindrical shape and is oriented axially. It comprises an outer annular bead, substantially at its middle in the axial direction, and intended to be located substantially at the surfaces 152 of the flanges.

The portion 114*bb*2 comprises at its outer periphery a cylindrical centering rim 164. This rim 164, which is carried by the element 114*b*, is configured to cooperate by axial sliding and radial support with the outer periphery of the other element 114*a* in order to ensure the centering, during mounting and operation, of this other element 114*a*. Alternatively, the element 114*a* could comprise such rim intended to cooperate with the element 114*b* with a view to centering thereof.

The rim 164 is intended to cooperate with the outer periphery of the flange 114*ab* of the element 114*a*, and in particular with the radially external free annular edge of its portion 114*ab*2. During mounting, the rim 164 thus extends around the portion 114*ab*2.

In the example shown, the rim 164 also ensures the centering of the ring gear carrier 154. The rim 164 can cooperate as indicated hereinabove with the outer periphery of the flange 160.

The rim 164 extends here continuously over 360°. It is thus neither split nor sectorised. The reference surface for the centering is thus uninterrupted.

The inner peripheral portions 114*ab*1, 114*bb*1 are angled with respect to the axis X of the ring gear 114. The portion 114*ab*1 extends radially from upstream to downstream in the direction outwards, and the portion 114*bb*1 extends from upstream to downstream in the direction inwards. In the example shown, the portions 114*ab*1, 114*bb*1 are angled from 0° to 90° with respect to the axis X, and preferably between 30 and 60°, and delimit an annular cavity 166 with a cross-section of generally triangular shape, the vertex of which is oriented radially outwards. Their axial positions are such that the centre line passes through the intersection of the median plane of the teeth set as well as its pitch diameter.

The portions 114*ab*1, 114*bb*1 make it possible to connect the portions 114*ab*2, 114*bb*2 to the bodies of the elements 114*aa*, 114*bb*. Due to the orientation of the parties 114*ab*1, 114*bb*1 and their connection to the longitudinal ends, respectively downstream and upstream, of the bodies 114*a*, 114*b*, these bodies are axially separated from one another by a predetermined distance.

Lubrication oil is intended to flow during operation through this inter-body space and penetrate into the cavity 166. Substantially radial passages are provided between the flanges 114*ab*, 114*bb* in order to allow for the removal of the oil radially towards the exterior of the ring gear. The oil passages are here formed on the one hand by substantially radial notches or slots 168 formed in the surfaces 152 of the flanges. Each flange comprises an annular row of notches 168 that are axially aligned with notches 168 of the other of the flanges. The notches are produced at a distance from the orifices 156 of the passage of the fastening means 158, from the hole of the pin 165 and from the holes 163. Each notch has for example a cross-section of semicircular (half-oblong) or rectangular shape as in the example shown (FIG. 5).

The notches are in fluidic communication, at their radially internal ends, with the cavity 166, and at their axially external ends with oblong shape oil outlet through-orifices 170 formed in the centering rim 164. In other words, the oil passages open at their radially external ends onto the outer cylindrical surface of the rim 164, to form there oil outlet orifices 170.

FIG. 6 shows a partial axial section of the reduction gear 110 in which Y designates the intersection between the plane P and the pitch diameter D for each teeth set 150. As can be seen in the drawing, the inner peripheral portion 114$ab$1, 114$bb$1 of each flange extends in a plane that passes substantially through the intersection point Y. This position as well as the aforementioned inclination are two important features in this embodiment.

Each inner peripheral portion 114$ab$1, 114$bb$1 has an inner peripheral surface 115$a$ that extends radially outwards in the extension of an end radial surface 115$b$ of the corresponding body. The axial distance between the surfaces 115$b$ corresponds to the inter-element distance and to the maximum axial dimension of the cavity 166.

The inner peripheral portions 114$ab$ 1, 114$bb$ 1 have a substantially constant thickness.

Except for the rim 164, the ring gear elements 114$a$, 114$b$ are symmetrical with respect to a median plane, perpendicular to the axis and passing substantially between the elements.

The ring gear 114 according to the invention is easier to produce, mount and control than those of prior technologies.

The invention claimed is:

1. A ring gear for an epicyclic or planetary reduction gear for a turbine engine, said ring gear extending around an axis and comprising first and second coaxial annular elements and comprising respectively two inner annular teeth sets of different orientation, each of said teeth sets having a pitch diameter and a median plane substantially perpendicular to said axis, and the intersection point in an axial cross-section of the ring gear, said first and second annular elements further comprising respectively first and second radially outer annular flanges for attaching said first and second elements to each other, wherein each of said first and second flanges comprises a peripheral portion extending in a plane that is angled with respect to said axis and that passes substantially through said intersection point and wherein the centreline of said peripheral portion passes through said intersection.

2. The ring gear according to claim 1, wherein said peripheral portion is an inner peripheral portion of each one of said first and second flanges.

3. The ring gear according to claim 2, wherein said inner peripheral portion connects a substantially radial outer peripheral portion of the corresponding flange to a longitudinal end of a body of the corresponding element.

4. The ring gear according to claim 3, wherein said body is substantially cylindrical and comprises at its inner periphery said teeth set.

5. The ring gear according to claim 4, wherein said bodies are at an axial distance from one another.

6. The ring gear according to claim 3, wherein said peripheral portions each have an inner peripheral surface that extends radially outwards in the extension of an end radial surface of the corresponding body.

7. The ring gear according to claim 1, wherein said peripheral portions each form an angle between 0° and 90° with respect to said axis.

8. The ring gear according to claim 1, wherein said peripheral portions delimit between them an inter-element annular cavity for the passage of oil.

9. The ring gear according to claim 1, wherein said peripheral portions have a substantially constant thickness.

10. An epicyclic or planetary reduction gear for a turbine engine, comprising a ring gear according to claim 1.

11. The ring gear according to claim 8, wherein said inter-element annular cavity has a cross-section of generally triangular shape.

\* \* \* \* \*